United States Patent [19]
Lee

[11] Patent Number: 5,433,144
[45] Date of Patent: Jul. 18, 1995

[54] FOOD PROCESSOR WITH STRAINER AND TRASH BASKET MEANS

[76] Inventor: Chin-Lung Lee, No. 173, Chung Hsiao Rd., Sec. 1, San Chung, Taipei Hsien, Taiwan

[21] Appl. No.: 354,011

[22] Filed: Dec. 5, 1994

[51] Int. Cl.⁶ .......................... A23N 1/02; A47J 19/02
[52] U.S. Cl. .......................................... 99/512; 99/511; 99/513
[58] Field of Search ............... 99/495, 509–513, 99/484, 536, 537; 210/360.1, 380.1, 369; 241/37.5, 92, 282.1, 282.2; 366/314

[56] References Cited

U.S. PATENT DOCUMENTS

| | | | |
|---|---|---|---|
| 2,311,379 | 2/1943 | Gillanders | 99/512 |
| 2,845,971 | 8/1958 | Cordero | 99/512 |
| 3,892,365 | 7/1975 | Verdum | 241/282.1 X |
| 4,183,293 | 1/1980 | Arao et al. | 99/513 X |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,840,119 | 6/1989 | Caldi | 99/512 |
| 5,222,430 | 6/1993 | Wang | 99/512 |

Primary Examiner—Timothy F. Simone
Attorney, Agent, or Firm—Bacon & Thomas

[57] ABSTRACT

A food processor including a motor housing base to hold a motor, a work bowl mounted around a top support on the motor housing base and having a front opening, a strainer basket fastened to a lid and turned within the work bowl by the motor, a cutter disposed within the strainer basket and turned by the motor, a top cover covered on the work bowl, a trash basket pivoted to the motor housing base and supported on a platform on the motor housing base adjacent to the front opening of the work bowl to collect trash from the work bowl, and a scraper slidably fastened to the top cover and by sliding block for removing trash from the strainer basket.

7 Claims, 3 Drawing Sheets

FOOD PROCESSOR WITH STRAINER AND TRASH BASKET MEANS

BACKGROUND OF THE INVENTION

The present invention relates to a food processor, and relates more particularly to a food processor comprised of a motor housing base to hold a motor, a work bowl mounted around a top support on the motor housing base and having a front opening, a strainer basket fastened to a lid and turned within the work bowl by the motor, a cutter disposed within the strainer basket and turned by the motor, a top cover covered on the work bowl, a trash basket pivoted to the motor housing base and supported on a platform on the motor housing base adjacent to the front opening of the work bowl to collect trash from the work bowl, and a scraper slidably fastened to the top cover and by sliding block for removing trash from the strainer basket.

Regular food processors commonly have a work bowl, a rotary chamber inside the work bowl for straining fruit and vegetable trash, and a trash basket outside the work bowl. When fruit and vegetable trash is moved out of the rotary chamber to the trash basket, part of fruit and vegetable trash may drop to the juice chamber in the work bowl.

SUMMARY OF THE INVENTION

The present invention has been accomplished to provide a food processor which eliminates the aforesaid problem. According to the preferred embodiment of the present invention, the food processor is comprised of a motor housing base, a trash basket, a work bowl, a strainer basket, a cutter blade, and a top cover, and two handles. The work bowl is mounted around a top support on the motor housing base and having a front opening. The strainer basket is fastened to a lid on the top of the top support of the motor housing base and turned within the work bowl by the motor, which is disposed inside the motor housing base. The cutter blade is disposed within the strainer basket and turned by the motor to cut and crush fruits and vegetables. The top cover is covered on the work bowl. The trash basket has one end pivotably connected to the motor housing base and supported on a platform on the motor housing base adjacent to the front opening of the work bowl. The handles are bilaterally connected between the motor housing base and the top cover. The top cover has a top sliding hole, a sliding block movably fastened to the top sliding hole, a scraper fastened to the sliding block, and a spring connected between the scraper and the top sliding hole. The scraper can be moved toward the strainer basket during the operation of the food processor, to remove fruit and vegetable trash from the strainer basket, permitting fruit and vegetable trash to be completely guided to the trash basket.

DETAILED DESCRIPTION OF THE PREFERRED EMBODIMENT

Figure 1:
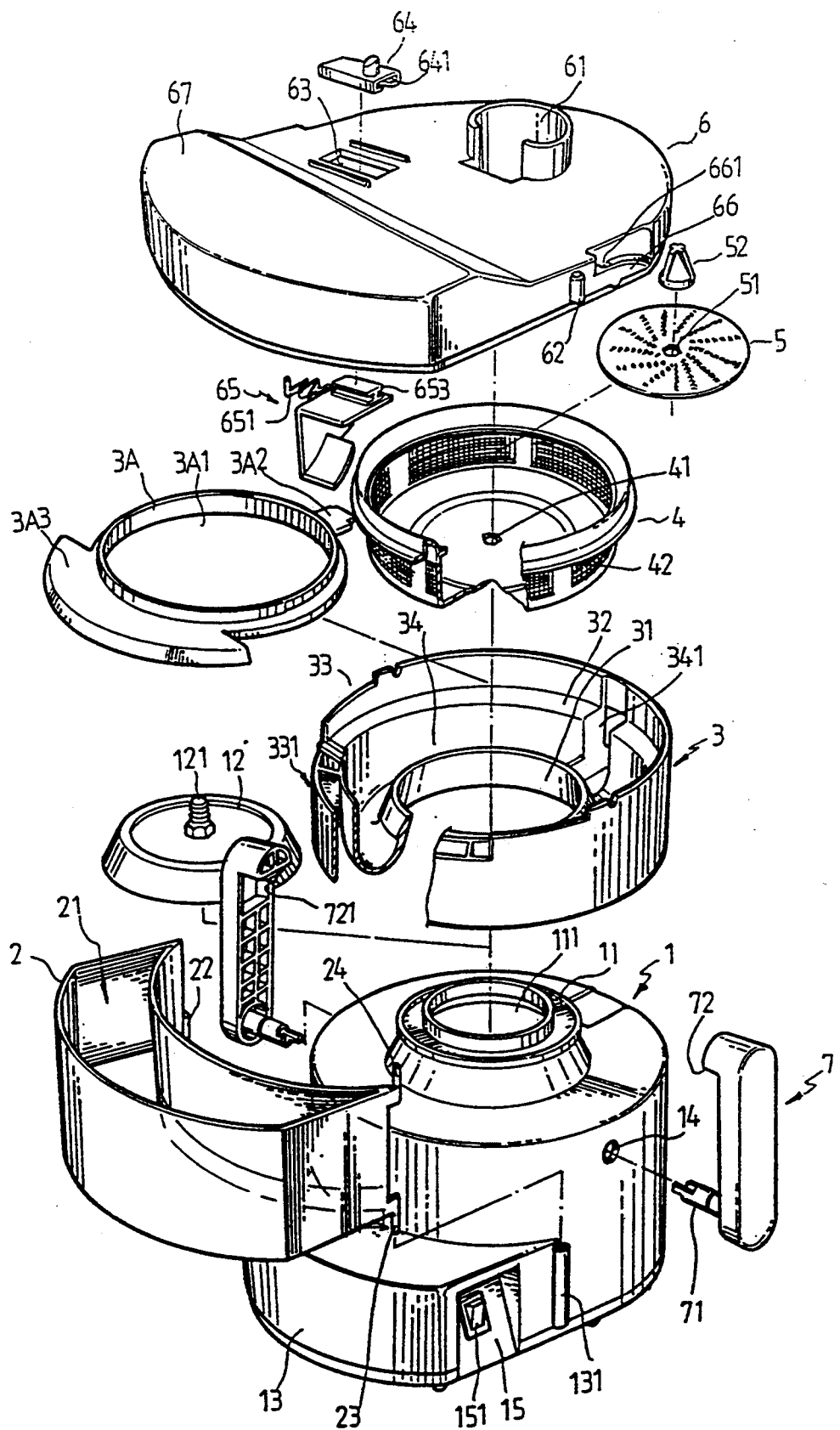
FIG. 1 is an exploded view of a food processor according to the present invention.
Figure 2:
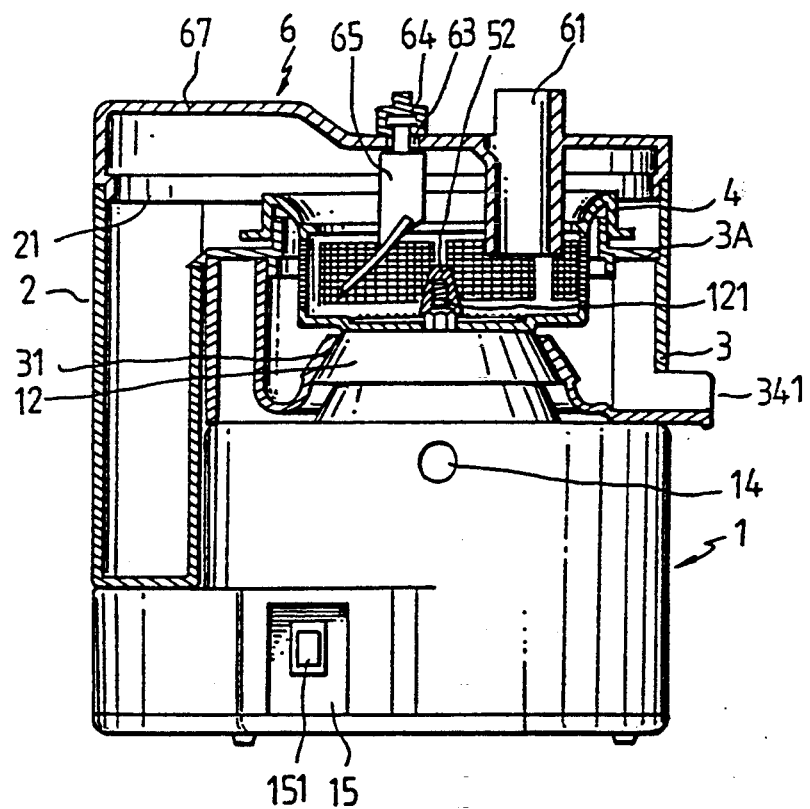
FIG. 2 is a side view in section of the food processor shown in FIG. 1.

Referring to FIGS. 1 and 2, a food processor in accordance with the present invention is generally comprised of a motor housing base 1, a trash basket 2, a work bowl 3, a strainer basket 4, a cutter blade 5, a top cover 6, and two handles 7.

The motor housing base 1 holds a driving motor (not shown) on the inside, having a top support 11 covered with a lid 12. The top support 11 defines a through hole 111 through which the output shaft of the driving motor passes. The lid 12 is coupled to the output shaft of the driving motor and turned by it about the top support 11, having a screw rod 121 inserted through the center through hole 41 on the strainer basket 4 and the center through hole 51 of the cutter blade 5 and then screwed up with a cap nut 52. The motor housing base 1 further comprises a platform 13 and opposite plug holes 14. The handles 7 have a respective plug rod 71 respectively fastened to the plug holes 14. The platform 13 comprises an axle housing 131 located on one side of the platform 13, which receives a downward axle 23 on the trash basket 2, a retaining hole 16 located on the other side of the platform 13 (see FIG. 4), which receives a retainer rod 22 on the trash basket 2, a recessed hole 15 at one side, and a motor control switch 151 installed in the recessed hole 15. The recessed hole 15 protects the motor control switch 151 against downward flow of fluid.

Figure 4:
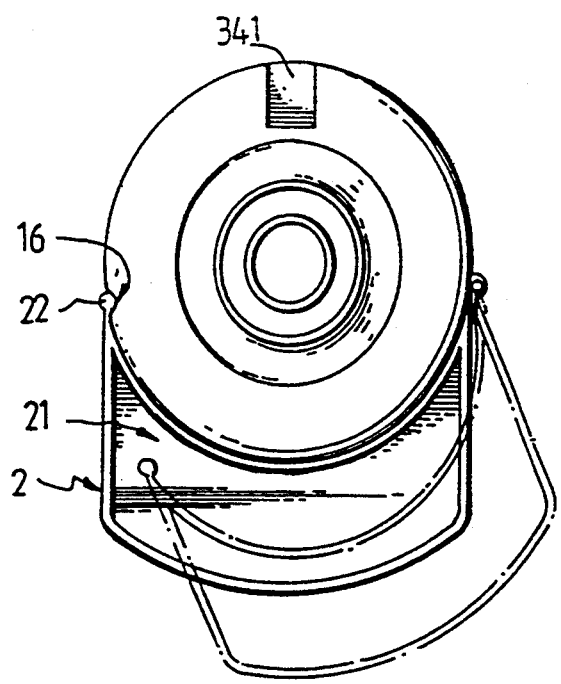
FIG. 4 is a schematic drawing showing the pivotal movement of the trash basket relative to the motor housing base and its positioning on the motor housing base.

The trash basket 2 defines a top open chamber 21, which receives trash from a front opening 331 on the work bowl 3, comprising a downward axle 23 and an upward axle 24 vertically aligned at one end and respectively turnably received in the axle housing 131 on the platform 13 of the motor housing base 1 and a respective axle housing 62 on the top cover 6, and a downward retainer rod 22 detachably fastened to the retaining hole 16 on the motor housing base 1 (see also FIG. 4). Before the retainer rod 22 is fastened to the retaining hole 16, the trash basket 2 can be turned about the axis through the axle housings 131 and 62. When the retainer rod 22 is fastened to the retaining hole 16, the trash basket 2 is supported on the platform 13 to receive trash from the front opening 331 of the work bowl 3.

The work bowl 3 is mounted on the motor housing base 1 around the top support 11, comprising a center mounting hole 31, which receives the top support 11 and allows the lid 12 to be rotated inside the work bowl 3 by the driving motor, an annular vertical wall 33 located around the outer periphery of the work bowl 3, a front opening 331 made on the annular vertical wall 33 and facing the top open chamber 21 of the trash basket 2, an annular inside flange 32 raised from the inside of the annular vertical wall 33, a packing ring 3A supported on the annular inside flange 32 within the annular vertical wall 33, a juice chamber 34 defined within the annular inside flange 32 around the center mounting hole 31, and a juice outlet 341 for guiding juice out of the juice chamber 234. The packing ring 3A defines a strainer basket mounting hole 3A1, having an outward projecting strip 3A2 horizontally covered over the juice outlet 341 at the top, and a flat outward flange 3A3 horizontally covered over the front opening 331 at the top.

The strainer basket 4 is mounted within the strainer basket mounting hole 3A1 and supported above the packing ring 3A, having a center through hole 41 through which the screw rod 121 of the lid 12 passes, and a meshed peripheral wall 42 through which juice flows to the juice chamber 34.

The cutter blade 5 is a circular cutter for cutting fruits and vegetables, having a center through hole 51 through which the screw rod 121 of the lid 12 passes. When the screw rod 121 of the lid 12 is inserted through the center through hole 41 of the strainer basket 4 and the center through hole 51 of the cutter blade 5, the cap nut 52 is threaded onto the screw rod 121 to hold the cutter blade 5 and the strainer basket 4 and the lid 12 together.

The top cover 6 covers on the annular vertical wall 33 of the work bowl 3, comprising a feed tube 61 through which fruits and vegetables are put into the strainer basket 4 for cutting by the cutter blade 5, an axle housing 62 at one side, which receives the upward axle 24 of the trash basket 2, a top sliding hole 63, a sliding block 64 fastened to the top sliding hole 63 to hold a scraper 65, a front flange 67 covered over the top open chamber 21 of the trash basket 2, two opposite side recesses 66 defining a respective retaining hole 661. The sliding block 64 defines a bottom track 641. The scraper 65 comprises a T-flange 653 at the top fastened to the bottom track 641, a thrust spring 651 stopped at the top sliding hole 63 of the top cover 6. The scraper 65 can be moved by the sliding block 64 to remove trash from the strainer basket 4. When the sliding block 64 is released from the hand, the thrust spring 651 automatically pushes the sliding block 64 back to its former position.

Figure 3:
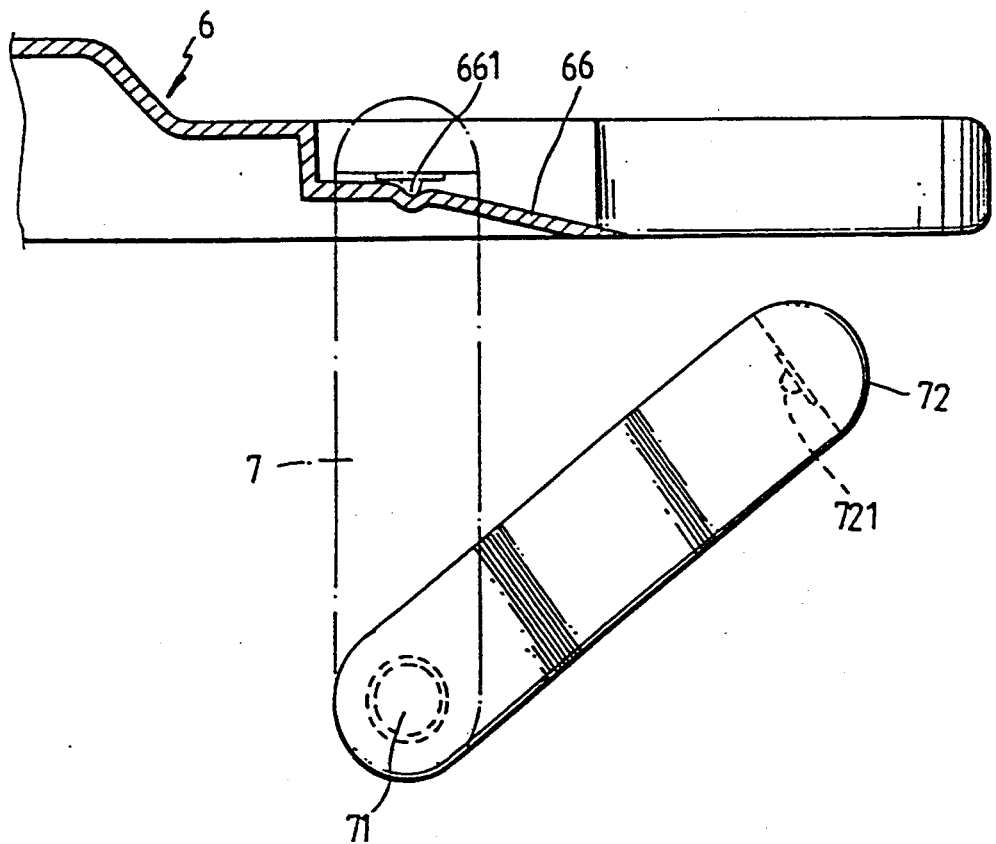
FIG. 3 is a schematic drawing showing the positioning of the handle on the top cover according to the present invention.

Referring to FIG. 3 and FIGS. 1 and 2 again, the handle 7 is an elongated arm having a plug rod 71 perpendicularly disposed at one end and turnable inserted into on plug hole 14 on the motor housing base 1, and a mounting rod 72 perpendicularly disposed at an opposite end and fitted into one side recess 66 on the top cover 6. The mounting rod 72 has a projecting portion 721 fastened to the retaining hole 661 on the corresponding side recess 66.

The assembly process of the food processor is simple and outlined hereinafter with reference to FIGS. 1 through 4. The work bowl 3 is mounted on the motor housing base 1, permitting the top support 11 of the motor housing base 1 to be received within the center mounting hole 31 of the work bowl 3. Then the screw rod 121 of the lid 12 is inserted through the center through hole 41 of the strainer basket 4 and the center through hole 51 of the cutter blade 5 and then screwed up with the cap nut 52, then the lid 12 is fastened to the output shaft of the driving motor, permitting the strainer basket 4 to be supported on the packing ring 3A inside the work bowl 3. Then, the mounting rods 72 of the handles 7 are respectively fastened to the side recesses 66 of the top cover 6, permitting the projecting portions 721 of the mounting rods 72 to be respectively fastened to the retaining holes 661 in the side recesses 66. Then, the trash basket 2 is fastened to the motor housing base 1 and the top cover 6 and supported on the platform 13 by inserting the downward axle 23 and the upward axle 24 into the axle housings 131 and 62 and fastening the retainer rod 22 to the retaining hole 16.

When fruits and/or vegetables are put into the feed tube 61, they are cut by the cuter blade 5. Juice thus obtained flows through the meshed peripheral wall 42 to the juice chamber 34 and then guided out of the food processor through the juice outlet 341.

Figure 5:
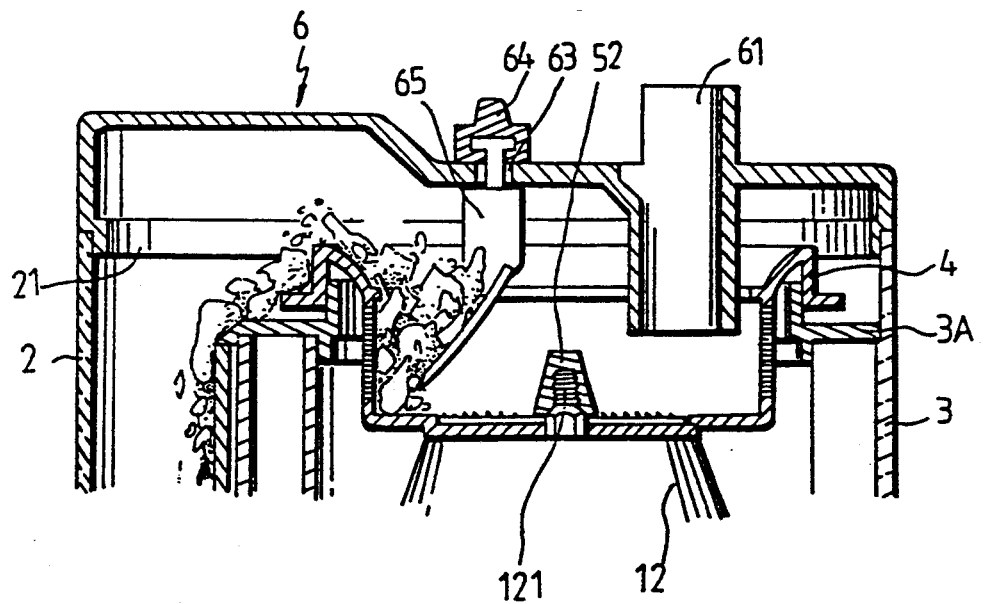
FIG. 5 shows the operation of the scraper to remove trash from the strainer basket.

Referring to FIG. 5, when the sliding block 64 is moved toward the strainer basket 4, trash is removed form the meshed peripheral wall 42 of the strainer basket 4 to the front opening 331 of the work bowl 3 by the scraper 65 and then guided to the trash basket 2 by the flat outward flange 3A3 when the strainer basket 4 is rotated and moved over the scraper 65. When the retainer rod 22 of the trash basket 2 is disconnected from the retaining hole 16 on the platform 13, the trash basket 2 can be turned outwards from the motor housing base 1 and the front flange 67 of the top cover 6 for cleaning.

While only one embodiment of the present invention has been shown and described, it will be understood that various modifications and changes could be made without departing from the spirit and scope of the invention.

What is claimed is:

1. A food processor comprising:

a motor housing base holding a driving motor, said motor housing base comprising a top support, a lid covered on said top support and turned about said top support by said driving motor, and a platform attached to said motor housing base, said lid having an upright screw rod screwed up with a cap nut;

a trash basket supported on said platform, said trash basket having one end pivoted to said motor housing base and defining a top open chamber for collecting trash;

a work bowl mounted on said motor housing base around said top support, said work bowl comprising a center mounting hole, which receives said top support and said lid, an annular vertical wall located around the outer periphery of said work bowl, a front opening made on said annular vertical wall and facing said top open chamber of said trash basket for letting trash be moved out of said work bowl to said trash basket, an annular inside flange raised from said annular vertical wall on the inside, a juice chamber defined within said annular inside flange around the center mounting hole of said work bowl, a juice outlet for guiding juice out of said juice chamber, a packing ring supported on said annular inside flange within said annular vertical wall, said packing ring defining a strainer basket mounting hole and having an outward projecting strip covered over said juice outlet and a flat outward flange covered over the front opening of said work bowl;

a strainer basket mounted on said strainer basket mounting hole around said upright screw rod of said lid and supported above said packing ring and turned by said driving motor through said upright screw rod, said strainer basket having a center through hole through which said upright screw rod of said lid passes, and a meshed peripheral wall through which juice flows to said juice chamber;

a circular cutter blade mounted around said upright screw rod of said lid and disposed inside said strainer basket and turned by said driving motor through said upright screw rod to cut and crush fruits and vegetables into juice, said circular cutter blade having a center through hole through which said upright screw rod of said lid passes; and a top cover covered on said annular vertical wall of said work bowl, said top cover comprising a feed tube through which fruits and vegetables are put into said strainer basket for cutting and crushing by said circular cutter blade, a top sliding hole, a sliding block moved in said top sliding hole and retained to said top cover by spring means, a scraper fastened to said sliding block and moved by said sliding block toward said strainer basket to remove trash from said strainer basket, and a front flange covered over said top open chamber of said trash basket.

2. The food processor of claim 1 wherein said trash basket has a downward axle and an upward axle vertically aligned at one end thereof and respectively turnably fastened to the axle housings on said top cover and said motor housing base.

3. The food processor of claim 2 wherein said trash basket has a retainer rod at one end opposite to said downward axle; said motor housing base has a retaining hole, which receives said retainer rod of said trash basket when said trash basket is supported on said platform of said motor housing base.

4. The food processor of claim 1 further comprising two handles bilaterally connected between said motor housing base and said top cover.

5. The food processor of claim 4 wherein said motor housing has two plug holes at two opposite sides for mounting said handles; said top cover has two side recesses defining a respective retaining hole for mounting said handles; said handles each has a plug rod at one end turnably inserted into one plug hole on said motor housing base, and a mounting rod at an opposite end detachably fitted into one side recess on said top cover, said mounting rod having a projecting portion detachably fitted into the retaining hole on the corresponding side recess on said top cover.

6. The food processor of claim 1 wherein said platform of said motor housing base comprises a side recessed hole and a motor control switch protected inside the side recessed hole on said platform of said motor housing base for controlling the operation of said driving motor.

7. The food processor of claim 1 wherein said sliding block defines a bottom track; said scraper comprises a T-flange raised from a top side thereof and fastened to said bottom track of said sliding block, and spring means connected to said top sliding hole of said top cover.

* * * * *